US007194679B1

(12) United States Patent
Green

(10) Patent No.: US 7,194,679 B1
(45) Date of Patent: Mar. 20, 2007

(54) WEB-BASED FILE REVIEW SYSTEM UTILIZING SOURCE AND COMMENT FILES

(75) Inventor: Robin Arthur Green, Toronto (CA)

(73) Assignee: International Business Machines Corporation, Armonk, NY (US)

(*) Notice: Subject to any disclaimer, the term of this patent is extended or adjusted under 35 U.S.C. 154(b) by 778 days.

(21) Appl. No.: 09/176,077

(22) Filed: Oct. 20, 1998

(51) Int. Cl.
*G06F 15/00* (2006.01)
*G06F 17/00* (2006.01)

(52) U.S. Cl. .................. 715/513; 715/501.1; 715/512; 715/760

(58) Field of Classification Search ............. 707/501.1, 707/4, 512, 513; 709/217, 236, 246; 345/863, 345/473; 715/501.1, 512, 513, 760
See application file for complete search history.

(56) References Cited

U.S. PATENT DOCUMENTS

| | | | | |
|---|---|---|---|---|
| 5,822,539 | A | * | 10/1998 | Van Hoff .................... 709/236 |
| 5,826,025 | A | * | 10/1998 | Gramlich .................... 709/217 |
| 5,909,679 | A | * | 6/1999 | Hall ............................... 707/4 |
| 5,963,966 | A | * | 10/1999 | Mitchell et al. ............ 707/513 |
| 6,041,335 | A | * | 3/2000 | Merritt et al. ............... 707/512 |
| 6,054,990 | A | * | 4/2000 | Tran ............................. 345/863 |
| 6,243,722 | B1 | * | 6/2001 | Day et al. .................... 707/512 |
| 6,401,131 | B1 | * | 6/2002 | Haverstock et al. ......... 709/246 |
| 6,466,213 | B2 | * | 10/2002 | Bickmore et al. ........... 345/473 |

OTHER PUBLICATIONS

Slein, J.A. et al., Requirements for distributed authoring and versioning on the World Wide Web, ACM StandardView, vol. 5, Issue 1, Mar. 1997, pp. 17-24.*
Whittaker, Steve, Talking to strangers: an evaluation of the factors affecting electronic collaboration, ACM Conference on Computer Supported Cooperative Work, ACM Press, New York, 1996, pp. 409-418.*

* cited by examiner

*Primary Examiner*—William Bashore
(74) *Attorney, Agent, or Firm*—Winstead, Sechrest & Minick, P.C.; Jeanine S. Ray-Yartletts

(57) ABSTRACT

A system for reviewing files which permits comments to be inserted in files to be viewed with a hypertext browser. When the hypertext mark-up language employed is HTML, text files are converted to an HTML representation. An HTML file is represented by a linked list of objects. Comment insertion markers and comment display objects are inserted at predefined points in the HTML linked list representation. The linked list is stored as a binary file and has a comment file associated with it. Access to the HTML file by reviewers and authors causes the regeneration of the HTML document by a Common Gateway Interface which recreates the linked list representation of the document from the binary file and which then generates HTML code from the linked list. Comments may be entered by reviewers working in parallel on the HTML document. Comments are displayed as inserted at the next regeneration of the HTML document by the system.

39 Claims, 2 Drawing Sheets

WEB-BASED FILE REVIEW SYSTEM UTILIZING SOURCE AND COMMENT FILES

FIELD OF THE INVENTION

The present invention is directed to an improvement in computing systems and in particular to systems for the review of files by multiple reviewers.

BACKGROUND OF THE INVENTION

Computer systems often provide review tools which allow writers and developers to review drafts of information. The information can be in the form of simple text files representing documents or computer program code, or may be structured documents such as those defined by such languages as HTML. The latter type of documents are in common use due to the existence of web-based publishing, both on the Internet World Wide Web, and on Intranets which are found within a company or organization.

Prior art systems, such as the IBM host-based tool, Revufile™, have been developed which provide online reviewing environments for flat linear documents. Such tools, however, are not appropriate for reviewing webs of information, and no appropriate web-based review tool has been developed. Previously developed systems are constrained in accepting comments to files made by different reviewers in parallel and in permitting dynamic display of the comments made to files.

It is therefore desirable to have a review tool which will provide an interaction with its users through a web browser, whether the tool is running through the Internet and the World Wide Web, or through a company Intranet or Local Area Network. Such a review tool or system will permit comments to be added to documents and displayed dynamically.

SUMMARY OF THE INVENTION

According to one aspect of the present invention, there is provided an improved system and method for storing, managing and displaying comments in a file review system.

According to another aspect of the present invention there is provided a file review system for storing and managing a set of comments associated with a source file, comprising:
  (a) means for accepting data from the source file and storing a representation of the source file as a markup file,
  (b) means for creating a comment file containing data representing the set of comments associated with the source file,
  (c) means for accepting new comments for inclusion in the set of comments associated with the source file and for updating the comment file to correspond to the complete set of comments,
  (d) means for generating an hypertext document from the markup file and from the comment file, the hypertext document corresponding to the source file and including portions corresponding to one or more of the set of comments associated with the source file, and
  (e) means for communicating the hypertext document to a user for display.

According to another aspect of the present invention there is provided a the above file review system in which the means for accepting data from the source file and storing the source file as a markup file further comprises means for representing the source file as a linked list of objects corresponding to a hypertext representation of the source file, wherein the markup file is a binary file representation of the linked list, the objects in the linked list being appropriately selected from the set of objects comprising simple tag objects, tag objects, end tag objects, text objects, comment insertion objects, comment display objects, complex whitespace objects, spaces objects, newlines objects, hypertext comment objects, ordered list item tag objects, and link tag objects.

According to another aspect of the present invention there is provided the above file review system in which the means for representing the source file as a linked list of objects further comprises means for inserting comment insertion objects into the linked list of objects and in which the means for generating a hypertext document further comprises means to include hypertext data in the hypertext document to display one or more symbols representing each comment insertion object.

According to another aspect of the present invention there is provided the above file review system in which the one or more symbols representing each comment insertion object comprise a hypertext link to a hypertext form for user input of a comment.

According to another aspect of the present invention there is provided a file review system of the type described above in which the means for representing the source file as a linked list of objects further comprises means for inserting comment display objects into the linked list of objects, each comment display object being associated with a comment insertion object and in which the means for generating a hypertext document further comprises means to include hypertext data in the hypertext document to display comments in accordance with the corresponding comment display objects.

According to another aspect of the present invention there is provided the above file review system in which each one of the comment display objects comprises
  (a) open tag data representing the open hypertext tags, at the location of the comment display object, in the linked list of objects
  (b) and in which the means for generating a hypertext document further comprises
    means to insert closing hypertext data in the hypertext document, prior to a selected one of the comments being displayed in the hypertext document, and means to insert reopening hypertext data in the hypertext document, following the selected one of the comments being displayed in the hypertext document, the closing hypertext data and the reopening hypertext data both being defined by the open tag data for the comment display object associated with the selected one of the comments being displayed.

According to another aspect of the present invention there is provided a file review system of the type described above in which the means for generating an hypertext document further comprises means to generate a hypertext document which corresponds to a predefined subsection of the markup file and the associated subsection of the comment file.

According to another aspect of the present invention there is provided a file review system of the type described above, in which each object in the linked list of objects has a type, and comprises contents derived from a portion of the source file, each comment insertion object and each comment display object comprises a contents line identifier, representing the line number defining the location of the object in relation to the source file, the comment file consists of comment line identifier data associated with the set of comments representing the line numbers in the source file with which each comment is related, and in which the means for generating a hypertext document further comprises (a) means to traverse the linked list of objects comprising, and means to select a display object from the linked list of objects, (b) means to determine the type of the display object, (c) means to generate hypertext data to correspond to the type of the display object and the contents of the display object, (d) means to identify the contents line identifier for the display object and for selecting comment display data from the comment file based on the contents line identifier and the comment line identifiers of the comment file, and (e) means to generate Hypertext data from the comment file representing the selected one of the set of comments corresponding to the comment line identifier associated with the contents line identifier.

According to another aspect of the present invention there is provided a file review system as described above in which each comment in the set of comments has associated with it a severity and in which the comment file consists of data representing the severity of each comment, and in which the means for accepting new comments for inclusion in the set of comments associated with the source file and for updating the comment file to correspond to the complete set of comments, comprises means for accepting data representing the severity of the new comments, and means for updating the comment file to add data representing the severity of the new comments.

According to another aspect of the present invention there is provided a file review system of the type described above, in which the means for generating a hypertext document comprises means for selectively excluding portions of the comment file corresponding to one or more comments in the set of comments, whereby a selectively defined subset of the set of comments is represented in the hypertext document.

According to another aspect of the present invention there is provided a file review system of the type described above in which comments have attributes which are defined from the following options: comment type, comment severity, comment date, comment status, comment author, and comment content.

According to another aspect of the present invention there is provided a file review system of the type described above in which system users are uniquely identified in the system and in which the means for accepting new comments further comprises means for selectively restricting the inclusion of new comments in the set of comments based on the unique identity of system users.

According to another aspect of the present invention there is provided a file review system of the type described above further comprising means to navigate the comment file to provide user access to comments in user-defined sequenced order.

According to another aspect of the present invention there is provided a web-based file review system for storing and managing comments from a plurality of reviewers, the comments being associated with one or more webs of source files, comprising (a) a parser to parse a selected one of the set of source files into a linked list of objects corresponding to a hypertext representation of the selected source file, the linked list further comprising comment insertion objects and comment display objects, the parser writing the linked list of objects to a binary markup file representing the linked list of objects and corresponding to the selected one of the set of source files, each comment display object being capable of being associated with one or more comments, (b) a set of comment files, each comment file being associated with a one of the set of source files and comprising data representing comments associated with the one of the set of source files, (c) common gateway interface program code means for accepting new comments for inclusion in the set of comments associated with a reviewer-defined source file and for updating the associated comment file, (d) common gateway interface program code means for generating a hypertext document from a markup file corresponding to reviewer-selected source file and from the associated comment file, the hypertext document corresponding to the reviewer-selected source file and (e) the hypertext document including portions corresponding to one or more of the set of comments associated with the reviewer-selected source file, the hypertext data for each portion relating to a comment to be displayed being defined by the associated comment display object, (f) the hypertext document selectively including hypertext links representing comment insertion objects, the hypertext links providing reviewers with forms for reviewer entry of comments, (g) the hypertext document selectively including hypertext data for calling the common gateway interface program for generating a hypertext document and the hypertext document selectively including hypertext data for calling the common gateway interface program for accepting new comments, (h) means for communicating the hypertext document to a browser for display.

According to another aspect of the present invention there is provided an article of manufacture comprising:

a computer usable medium having computer readable program code means embodied therein for causing the storage and management of comments in a web-based file review system, the comments being from a plurality of reviewers, and being associated with one or more webs of source files, the computer readable program code means in the article of manufacture comprising (a) computer readable program code means for causing a computer to parse a selected one of the set of source files into a linked list of objects corresponding to a hypertext representation of the selected source file, the linked list further comprising comment insertion objects and comment display objects, the parser writing the linked list of objects to a binary markup file representing the linked list of objects and corresponding to the selected one of the set of source files, each comment display object being capable of being associated with one or more comments, (b) computer readable program code means for causing the computer to create and manage a set of comment files, each comment file being associated with a one of the set of source files and comprising data representing comments associated with the one of the set of source files, (c) computer readable program code means for causing the computer to accept new comments for inclusion in the set of comments associated with a reviewer-defined source file and to update the associated comment file, (d) computer readable program code means for causing the computer to generate a hypertext document from a markup file corresponding to reviewer-selected source file and from the associated comment file, the hypertext document corresponding to the reviewer-selected source file and the hypertext document including portions corresponding to one or more of the set of comments associated with the reviewer-selected source file, the hypertext data for each portion relating to a comment to be displayed being defined by the associated comment display object, the hypertext document selectively including hypertext links representing comment insertion objects, the hypertext links providing reviewers with forms for reviewer entry of comments, the hypertext document selectively including hypertext data for calling the common gateway interface program for generating a hypertext document and the hypertext document selectively including hypertext data for calling the common gateway interface program for accepting new comments, (e) computer readable program code means for causing the computer to communicate the hypertext document to a browser for display.

According to another aspect of the present invention there is provided a computer program product for use with a hypertext server, the computer program product comprising:

a computer usable medium having computer readable program code means embodied in the medium for causing the storage and management of comments in a web-based file review system, the comments being from a plurality of reviewers, and being associated with one or more webs of source files, the computer program product having:

(a) computer readable program code means for causing a computer to parse a selected one of the set of source files into a linked list of objects corresponding to a hypertext representation of the selected source file, the linked list further comprising comment insertion objects and comment display objects, the parser writing the linked list of objects to a binary markup file representing the linked list of objects and corresponding to the selected one of the set of source files, each comment display object being capable of being associated with one or more comments, (b) computer readable program code means for causing the computer to create and manage a set of comment files, each comment file being associated with a one of the set of source files and comprising data representing comments associated with the one of the set of source files, (c) computer readable program code means for causing the computer to accept new comments for inclusion in the set of comments associated with a reviewer-defined source file and to update the associated comment file, (d) computer readable program code means for causing the computer to generate a hypertext document from a markup file corresponding to reviewer-selected source file and from the associated comment file, the hypertext document corresponding to the reviewer-selected source file and the hypertext document including portions corresponding to one or more of the set of comments associated with the reviewer-selected source file, the hypertext data for each portion relating to a comment to be displayed being defined by the associated comment display object, the hypertext document selectively including hypertext links representing comment insertion objects, the hypertext links providing reviewers with forms for reviewer entry of comments, the hypertext document selectively including hypertext data for calling the common gateway interface program for generating a hypertext document and the hypertext document selectively including hypertext data for calling the common gateway interface program for accepting new comments, (e) computer readable program code means for causing the computer to communicate the hypertext document to a browser for display.

According to another aspect of the present invention there is provided a method of storing and managing a set of comments associated with a source file, in a file review system, the method comprising the steps of (a) accepting data from the source file and storing a representation of the source file as a markup file, (b) creating a comment file containing data representing the set of comments associated with the source file, (c) responding to user input to accept new comments for inclusion in the set of comments associated with the source file and updating the comment file to correspond to the complete set of comments, (d) responding to user input to dynamically generate a hypertext document from the markup file and from the comment file, the hypertext document corresponding to the source file and including portions corresponding to one or more of the set of comments associated with the source file, (e) communicating the hypertext document to a user for display.

According to another aspect of the present invention there is provided a program storage device readable by a machine, tangibly embodying a program of instructions executable by the machine to perform method steps for storing and managing comments in a web-based file review system, the method steps comprising the steps of the above method.

Advantages of the present invention include a review tool in which the only software required on the reviewer's computer is a browser that supports the level of hypertext generated by the CGI of the review tool (the system of the preferred embodiment uses HTML 3.2). The reviewer's browser can be running on any platform; the CGI of the system knows nothing about the reviewer's environment.

The CGI, and any upgrades or fixes to it, need to be installed only on the author's workstation. Reviewers do not need to install or upgrade anything; the only indication they may have that an upgrade has occurred is that new function is available. A department of authors can further reduce the impact of upgrading by setting up a dedicated server for all webs created in the department.

Because the CGI runs on any Intel-based workstation, technical writers, managers, developers and others can install the system of the preferred embodiment on their workstations, and allow others to review their webs.

The user can shut down and restart a server machine with minimal impact on users, because each CGI call is a separate invocation of the CGI program. No comments are lost, and links within the review documents that a user was viewing before the shutdown will work again as soon as the server is brought back up.

BRIEF DESCRIPTION OF THE DRAWINGS

The preferred embodiment of the invention is shown in the drawings, wherein.

Figure 1:
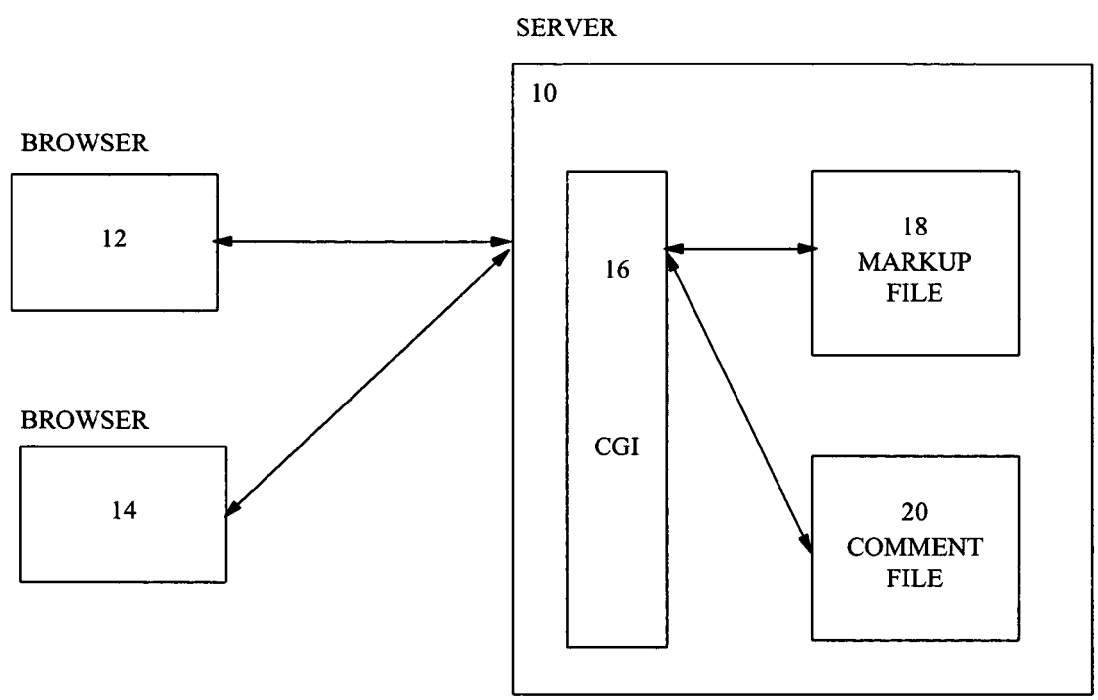
FIG. 1 is a block diagram showing the architecture of the review tool of the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring to FIG. 1, there is illustrated in a block diagram view, the architecture of the preferred embodiment of the invention. In FIG. 1, a server 10 is shown connected to browser 12 and browser 14. Server 10 is shown containing CGI 16, markup file 18 and comment file 20. The server 10, and browsers 12, 14 may be located on the same computer or on different computers, in which case the connection between browsers 12, 14 and server 10 may be achieved over an Internet connection, or a Local Area Network connection. In the preferred embodiment, the browsers are commercially available HTML browsers such as Netscape Navigator™. CGI 16 is a computer program located in the server and referenced by the appropriate cgi-bin designation for common gateway interfaces in HTML. CGI 16 accesses both markup file 18 and comment file 20.

The system of the preferred embodiment is implemented in HTML and in C++. HTML is a system that permits the creation of "hypertext", a way of presenting information online with connections between one piece of information, such that non-linear navigation of a single file or several files is possible. The users of the system must run browsers which are capable of reading HTML documents. The functionality of much of the system is provided using forms and links in predefined HTML files which are accessible by users of the system. Other aspects of the system, such as parsing input files, and retrieving data from markup file 18 and comment file 20, are implemented in C++ code. As will be appreciated by those skilled in the art, other markup languages that permit the generation of hypertext (with compatible browsers), and other programming languages may be used to implement the system of the invention.

The system of the preferred embodiment provides access to a collection of files for review and comment by one or more reviewers. A single collection of files is termed "a review" in the system of the preferred embodiment. A given review, or collection of files, may be considered to be itself a web, but as is set out below, the system will function for collections of files even if the files were not created as webs in the sense of being designed originally to be mutually linked HTML files.

The system recognizes users as falling into one of the following classes, for any given review: Author, Reviewer, Reader, and Administrator.

Figure 2:
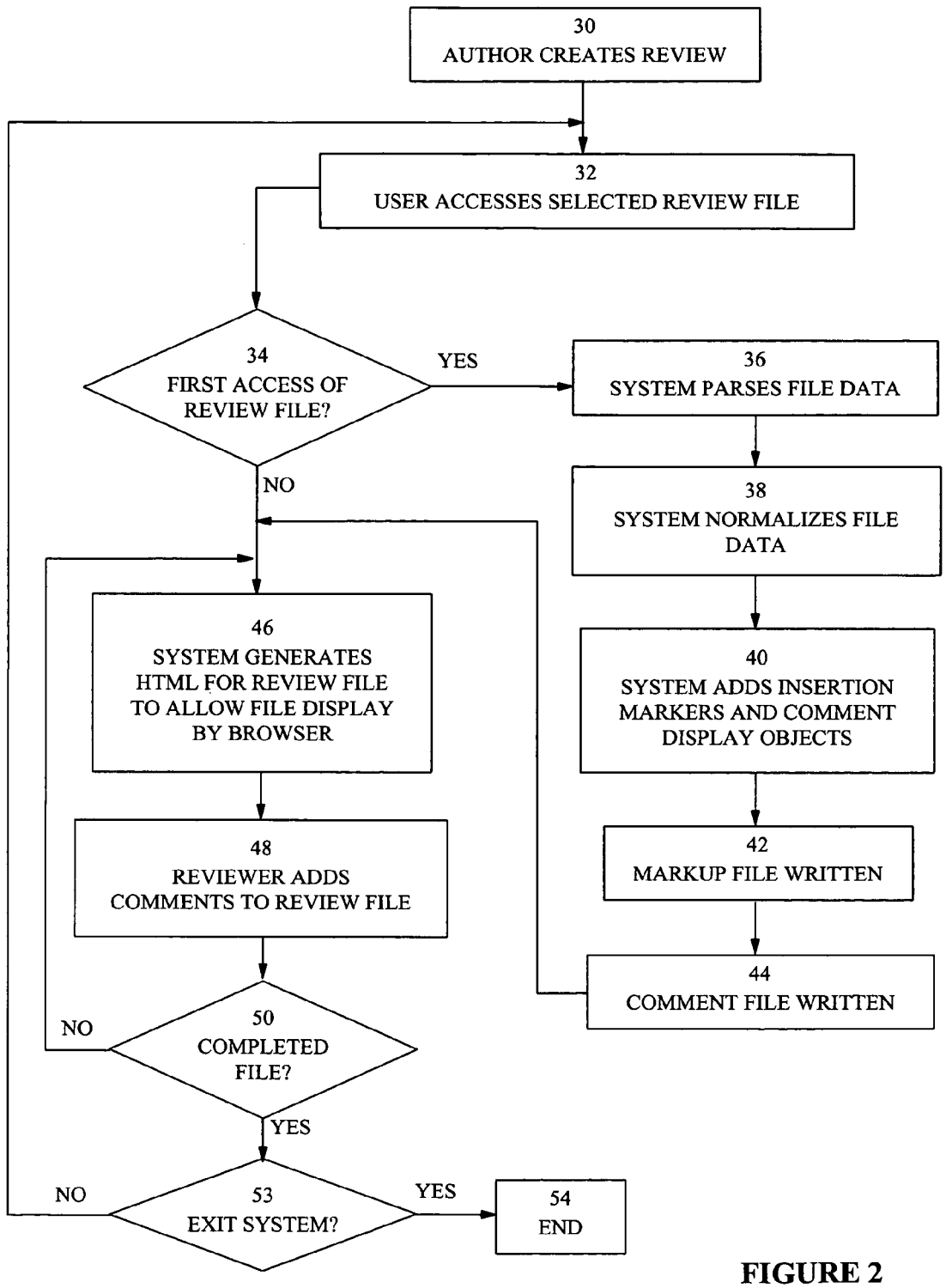
FIG. 2 is a flowchart showing a high-level representation of the operation of the review tool of the preferred embodiment.

In FIG. 2, there is illustrated in a flow chart view, a high-level representation of the algorithm of the preferred embodiment.

Box 30 in FIG. 2 represents the creation of a review by an author. Each author is able to create one or more reviews. The author creates a review by placing one or more review source files in a directory to which the server is provided access. The author is then able to use HTML forms provided by the system to specify that the source files are to be considered a review by the system and to specify the types of the various source files (for example, flat text, HTML, gif, jpeg, xbm files). The author is also able to specify the order in which the files will be displayed for users of the review. Other steps may also be carried out by the author at this point and these will be described in further detail below.

It is possible for an author to create a review from a set of HTML files, or from a set of flat text files, or both. For word-processing applications or SGML applications, the system of the preferred embodiment requires the creation of HTML or flat text versions of the documents before creating a review. There is no conversion in the preferred embodiment from formats such as IBMIDDOC (trade-mark), Lotus WordPro (trade-mark), or Microsoft Word (trade-mark). However, these applications usually have built-in transforms or export utilities to generate either flat text or HTML text files.

In FIG. 2, box 32 represents the step of a reviewer accessing a particular selected review file from an author-defined review. If the review file has not yet been accessed by a reviewer, the system of the preferred embodiment carries out a series of steps as shown in boxes 36, 38, 40, 42, 44 in FIG. 2. These steps are described in more detail below. The end result of these steps is to create a markup file 18 and a comment file 20, as shown in FIG. 1, which are able to be accessed by CGI 16 to create an HTML file representing the review file, as is shown in box 46 in FIG. 2.

The reviewer is able, using the mechanism set out below, to add comments to the review file (shown in box 48 of FIG. 2). The reviewer may move to other files in the review (shown in decision box 50 of FIG. 2). Although the flowchart of FIG. 2 shows the completion of the reviewer's use of a particular review file as a sequential step following the addition of comments to a review file, it will be appreciated that the reviewer may move to another review file without adding comments to a first review file. The reviewer may either select another review file from the list of files contained in the review, or the reviewer may follow a link from a first review file to another review file. Similarly, the reviewer may exit the system itself by terminating the browser program or by using the browser to select a file outside the review.

As is apparent from the architecture of the system, as shown in the example of FIG. 1, it is possible for several browsers to access the same review and review file, at the same time. The architecture of the system provides that comments may be accepted by different reviews at the same time. Similarly, authors may take action on the comments while reviewers are browsing and adding comments to the review.

On the first access of a file by a reviewer, the system performs the steps summarized in boxes 36, 38, 40, 42, 44 in FIG. 2.

The first step carried out by the system of the preferred embodiment is the parsing of the input file (also referred to as the source file or source document). The parsing of the input file is carried out by the following process:

1. The contents of the file is read into a linked list of objects. The file is broken down into the following objects:
   HTML tags (e.g. <body>)
   HTML end tags (e.g. </p>)
   Whitespace between tags (e.g. a newline character between </p> and <p>)

Text (Note that whitespace within a text object is part of the text object, whereas whitespace between two tags is a whitespace object.)

HTML comments (e.g. <!--Test-->)

In the preferred embodiment, each HTML tag or end tag is assigned a unique numeric value in the linked list that identifies the tag. For example, any tag named <a>, regardless of attributes (<a name="bob">, <a href="jim">) is assigned the numeric value 1, while any tag <html> has the numeric value 23. By assigning a numeric value to each tag, the linked list can rapidly be searched by type of HTML tag. For example, a search for the first <p> tag in the file will be implemented by the process of iterating through all objects in the linked list, checking each tag object's value for the value associated with a <p> tag and returning the first match.

2. Check the file for HTML markup. In the preferred embodiment, for the file to be considered valid HTML, it must meet these conditions:

At least ⅔ of the HTML tags found in the document must be recognized tags that are part of the HTML 3.2 standard, At least one of <html>, <head>, <title>, or <body> must be present, and There must be at least one HTML tag for every 1,000 bytes of text.

It is necessary for a file to match all three conditions because the file being processed may be a flat text file containing excerpts of HTML for illustration, or may be a program source file that processes HTML documents. Simply checking for <html> somewhere in the document would not be adequate. The above criteria will result in misidentification in some cases. Where the system is to be implemented in circumstances where it is likely that misidentifications will occur, the criteria for identifying a file as being HTML can be made more rigorous.

3. If the file is not found to be valid HTML, it is considered to be a flat text file. The linked list is modified to reflect an HTML document consisting of flat text by inserting HTML tags and a title before and after the text:

a. Objects for the following tags and the file's name are inserted in the linked list prior to the flat text object. Each tag is shown in square brackets:

[<html>] [<head>] [<title>] [filename] [</title>] [</head>] [<body>] [<pre>]

b. Objects for the following tags are added after the flat text object:

[</pre>] [</body>] [</html>]

The resulting linked list, if saved to disk and displayed by the program in a browser, would look like a flat text file, displayed in a fixed-pitch font with line breaks exactly where they occur in the source file.

The result of the parsing of the input file is a linked list which reflects an HTML document. The next step shown in FIG. 2 is the normalization of the file data as shown in box 38. The normalization of the data in the linked list is carried out by the following steps:

1. The linked list is scanned for text objects within the document body that are not enclosed within any HTML tags other than the <body> tag. Paragraph start and end tags are added to the start and end of such text objects. An example of an HTML file which requires normalization is the following:

<html><head><title>Bad HTML</title></head>
<body>
This should have been in a paragraph
<p>This already is </p>
</body></html>

The sentence "This should have been in a paragraph" is not within <p> or any other tags within the body, so a <p> is added after <body> and a </p> is added after "paragraph".

2. Certain tags that may interfere with the proper functioning of the CGI application, such as some <meta> tags that force a document refresh after a specified period, or prevent a document refresh altogether, are removed. If left in the document, these meta tags might cause the file to display improperly in a CGI environment.

3. Certain HTML-defined symbols, such as the string . which represents a period, are converted to their text equivalents. This is done for any symbol that might be construed as an end-of-sentence indicator, such as a period, exclamation point, question mark, or colon. The change is made so that adding comment insertion markers after each sentence can be more easily accommodated later.

4. Unnecessary HTML tags that are commonly inserted by certain HTML-generating tools are removed. These tags often clutter up an HTML file and make parsing more difficult. An example of such HTML code is a list marked up as follows:

<dl>
<p>
<dt>Term</td>
<p>
<dd>Definition text</dd>
</dl>

This list is converted during normalization, by removing the unnecessary <p> tags, to result in the following code:

<dl>
<dt>Term</td>
<dd>Definition text</dd>
</dl>

5. Matching end tags are added for any start tags that are not properly closed. For example, in HTML it is allowable to indicate the end of one paragraph or list item simply by starting the next one:

<p>One two
<p>Buckle my shoe
<ul>
<li>Three four
<li>Knock at the door
</ul>

Since incomplete HTML makes automated parsing more difficult, end tags are added as follows:

<p>One two</p>
<p>Buckle my shoe</p>
<ul>
<li>Three four</li>
<li>Knock at the door</li>
</ul>

This process adds end tags for paragraphs (<p>), list items (<dt>, <dd>, <li>), examples (<pre>), high-level tags (<html>, <head>, <title>, <body>), and heading tags (<h1> . . . <h6>).

As the above indicates, the normalization process is carried out on the file representation found in the linked list data structure first created in the parsing stage (of block 36 in FIG. 2). The use of a linked list permits the efficient insertion and deletion of objects during the normalization step. The resulting data structure represents an HTML document which will be displayed as a text equivalent to the source file. The normalization step adds objects and deletes objects to allow comment insertion and display to be carried out more efficiently and effectively.

Once the file has been read into a linked list and normalized, the linked list is manipulated in a series of steps that add comment insertion markers and comment display objects at key points (this is represented in FIG. 2 by box 40). The comment insertion markers and comment display objects are each objects which are added to the linked list representation of the HTML document which represents the input file, or source document.

A comment insertion marker is used by the system of the preferred embodiment to permit the display of a hypertext link that allows a reviewer to add a comment at a particular point. A comment display object is used by the system of the preferred embodiment to determine where, and how, to display comments that were added at a specific point.

The following describes how the step of box 40 in FIG. 2 is carried out:

1. Any text object that is stored between a <pre> tag and its matching </pre> tag is split into several objects:
   A comment insertion marker at the start of each line
   A text object for each line
   A whitespace object for the carriage return at the end of each line
   A comment display object at the end of each line
2. A comment insertion marker is added at the start of each paragraph-level HTML tag, such as <p>, <li>, <dt>, and headings (<h1> . . . <h6>), and a comment display object is added after the matching end tag for each of the above.
3. Certain regions of the linked list may now contain comment insertion markers and comment display objects that do not belong. For example, there may be markers within a table because the table contains lists or paragraphs. Or there may be a set of nested lists in which markers were inserted in a fashion that will make displaying comments difficult. These markers and display objects are removed.
4. Markers and display objects are added to each row in a table.
5. Certain combinations of markers and display objects are rectified so that there is a one-to-one correspondence between them. For example, a pattern such as [M][C][M][M][C] may develop (where M is a marker and C is a comment display object). This is changed by removing one of the two consecutive markers, with a resulting pattern of [M][C][M][C]. Note that there are intervening text and tag objects between these marker and display objects that are not shown in this example.
6. The entire linked list is scanned sequentially, and a record of what tags are currently open is stored in a variable. Each time a comment display object is encountered, the currently open tags are saved into that comment display object, so that, if a comment later gets displayed at that location, the system of the preferred embodiment can determine what HTML tags to close before displaying the comment and what tags to open after the comment.
7. For list items in ordered lists, a start attribute must also be added so that, if a list is closed by a comment display object because a comment is being shown there, the next item in the list starts at the right number. An example of how a list is converted is shown for the following list:
   <ol>
   <li>[M]One</li>[C]
   <li>[M]Two</li>[C]
   </ol>
   This list is converted to the following:
   <ol>
   <li start=1>[M]One</li>[C]
   <li start=2>[M]Two</li>[C]
   </ol>
   Without this added attribute, if a comment were added to the first list item, the resulting HTML would display as two single item lists ("One" and "Two") both starting with the number 1, interleaved with the comment text. To avoid this, the list is re-written in the linked list to maintain the ordering of the source document, despite interleaved text additions for the comments. This is because the ordered list gets closed before the comment and reopened after it.

The linked list now consists of a set of text, tag, end tag, comment, whitespace, marker, and comment display objects that can be used to generate views of the document dynamically, with comments being shown wherever they are added and all tags properly closed.

As shown in box 42 of FIG. 2, the linked list is written to a "markup" file, which is a binary file that can later be read to quickly recreate the linked list. Characteristics of the markup file are as follows:

For each object, its type, length, and content are stored in a sequence of one or more bytes.

An object's type (HTML comment, tag, etc.) is identified by the top four bits of its first byte. This allows for sixteen different object types, of which the following are used:
   Simple tag—a tag object with no attributes (e.g. <html>)
   Tag—a tag object with attributes (e.g. <body bgcolor="#FFFFFF">)
   End tag
   Text
   Comment Insertion Marker
   Comment Display
   Complex whitespace (combinations of spaces, newlines, tabs, etc.)
   Series of spaces
   Series of newlines
   HTML Comment
   Ordered list item tag (different from regular tag so that display functions know when to display the start attribute on the list item if a comment is inserted)
   Anchor tag used for links. (Different from regular tag so that, when the file is displayed, the system of the preferred embodiment knows to add its own CGI information to the link that gets generated. This allows links from one document to another to invoke the system of the preferred embodiment to request the file.)

An object's length is identified by the bottom four bits of its first byte if the length is under 15 bytes, or by the next one or two bytes if the length is over 15 bytes.

An object's content is stored, to the extent required. For HTML tags, the leading "<" is not included because the object's type, "Tag", presupposes a starting "<". For HTML end tags, the leading "</" characters are not included because the object's type, "End Tag", presupposes a starting "</".

Because a typical HTML start or end tag is shorter than 15 characters, the typical overhead of storing the linked list, versus storing the raw HTML, is negligeable. For example, the 6-character text string "<html>" becomes a six-character binary string in the markup file, broken down as follows:

First four bits of first byte identify the object as a Tag
Last four bits of first byte identify the length as 6 characters
Remaining bytes are "html>", since the leading "<" is not needed given that the object is known to be a Tag.

For end tags, there is even a space savings, as almost all HTML tags are shorter than 15 characters and the "</" can therefore be converted into a single byte.

For multi-character objects consisting entirely of spaces or entirely of newlines, the entire whitespace can usually be represented in one or two bytes. For example, a sequence of 12 spaces is represented in one byte as follows:

The top 4 bits identify the object as a set of 1 to 16 spaces.
The bottom 4 bits identify the number of spaces, from 1 to 16.

For comment insertion markers and comment display objects, the numeric value (from 1 to N) of the object is stored. In most cases, a given marker object shares the same numeric value as the next comment display object that follows it.

The markup file record structure is such that a typical markup file is within 10% of the size of the HTML source file it was generated from, and in some cases is smaller. This expected size is achieved despite the overheads of:

64 bytes of header information at the start of the markup file
The addition of comment insertion markers and comment display objects, including the display objects' open tags and the numeric values for both markers and display objects
The addition of HTML tags required for normalization Once the markup file is written, the system of the preferred embodiment also generates an empty comment file (the step of box 44 in FIG. 2). This file contains a header record with the file's title and other information. When comments are added by reviewers, they are appended to the end of this comment file.

The comment file contains variable-length records for each comment. Each comment record contains data representing the comment status, type, disposition, user number of the user creating the comment, date (in seconds format), comment text length, line number, comment number on this line, and the text of the comment. The comment record also has pointers to the logical next and previous comments.

Order is maintained through these pointers, within each comment record, to the logical previous and next records. Thus, when a comment is inserted at line 12, for example, and the immediately preceding comment is on line 9, with the immediately following one on line 17, the new comment gets added to the end of the comment file, its Previous pointer points to line 9, and its Next pointer points to line 17. The Next pointer of the comment on line 9, and the Previous pointer for the comment on line 17, are also updated to point to the new comment. By iterating through the file starting with the virtual first record and using each record's Next to determine what record to read next, sequential order can be preserved without requiring constant resorting either at comment addition time or file display time.

Turning again to the architecture of the system as shown in FIG. 1, the way in which reviewers access a file in a given review may be described. A reviewer uses a browser to view an HTML document made available by the server. The HTML document contains a list of different reviews. The reviewer selects a particular review from the HTML page displayed by the reviewer's browser. The server then displays (by another HTML document) the files available for review by that reviewer in the selected review. The reviewer selects a file. If the file has been accessed by a reviewer before, a markup file and a comment file will have been created. If not, the two files are created, as is described above. By selecting a file to be displayed, the HTML document displayed by the browser of the reviewer, gives rise to a CGI call to the C++ code resident in the server. This in turn translates the markup file data into the linked list which corresponds to the HTML markup for the source document. The link list is then translated into an HTML document which is then sent to the browser of the reviewer. From the perspective of the reviewer seeing the document as displayed by the HTML browser, this document corresponds to the source document, except that the document contains comment insertion markers.

From the perspective of reviewers, the system will function as follows:

1. Each reviewer logs on to system and selects a review from the list of reviews shown to the reviewer.
2. Once the reviewer has selected a review, the reviewer can select a page (or file) within the review, and begin reading. The page will contain numbered links at the start of every sentence, paragraph, list item, and unformatted text line.
3. At any part of the document where the reviewer wants to request a change or make a suggestion, the reviewer clicks on the numbered link closest to the pertinent sentence or line.
4. A comment form appears, allowing the reviewer to type in a comment and describe the priority level of the suggestion or change by selecting a comment type (see below). The reviewer can also choose to send a message to the author or to another reviewer to draw their attention to the comment.

Thus from the perspective of the reviewer, the system is simple and intuitive to use. The system also operates in close to real time.

Because of the efficient storage structure of a markup file, it can be read very quickly back into a new linked list each time the document is requested, and an output can be generated for the linked list. By using a linked list both to create the markup file, and to display views of it each time the document is requested, the system of the preferred embodiment can perform tasks such as dynamically inserting comments and numbered markers, or adding informational messages at the start or end of the body of the file, with minimal overhead and almost no text searching.

Another feature of the markup handling of the system of the preferred embodiment is a sections feature, which allows users to view only a portion of a large file at one time. The sections feature is only activated for a markup file when a user who has chosen to view a file in sections first accesses the file. The following algorithm is used when such a user requests a file:

1. If the markup file contains fewer than a threshold number of comment insertion markers (e.g. 40), the markup file header is modified to indicate that the document is not eligible for division into sections. The entire file is displayed and this algorithm is abandoned.

2. If the markup file is eligible for sectioning, the system of the preferred embodiment scans the document to determine how frequently heading tags occur. As referred to above, this can be done quickly because the markup file is stored in a linked list. If heading tags occur on average at least once for every 40 comment insertion markers, the system of the preferred embodiment uses a heading strategy to section the file. Otherwise the system of the preferred embodiment uses an insertion marker strategy.

3. For either strategy, the system of the preferred embodiment creates a sections file, associated with the marker file. This sections file contains records identifying the starting and ending offsets in the markup file for each of the following sections:

The header section: Everything from <html> up to and including the <body> tag. This section is always part of the HTML that gets sent back to a user's browser.

The body sections

The footer section: Everything from </body> to the end of the file. This section is always part of the HTML that gets sent back to a user's browser.

4. The heading strategy involves breaking the body sections down every time:

(a) A heading is found, AND (b) The last section starting boundary is at least five comment insertion markers before the current heading.

5. The insertion marker strategy involves breaking the body sections down every time:

(a) At least 40 comment insertion markers have occurred since the last section starting boundary, AND (b) The current comment display object has no Open Tag values associated with it. This is used to guarantee, for example, that a section does not start or end in the middle of a list or table.

Once the sections file is created, the system of the preferred embodiment determines how many sections to display of the file at one time, based on the user's section-viewing preferences. It then creates a linked list consisting of the header section, the required body sections, and the footer section. Only those portions of the markup file that are required to create the requested sections are read; other parts are scanned over. This makes it much faster to display a section of a large file, than would be accomplished by reading the entire markup file into a linked list and then splicing out unneeded sections.

As is set out above, the system of the preferred embodiment employs a linked list to represent the files in a review. A linked list is a standard computational device for creating an easily manipulated, sequential set of objects. The standard doubly-linked list has the following characteristics and functions:

Each object contains a data portion and pointers to its previous and next elements Functions are provided to iterate forwards or backwards through the list to the next or prior object, or the first or last object.

Functions are provided to add an object or another linked list of objects to a particular object in the list. The attachment can occur immediately before or after the selected object, or at the start or the end of the list Functions are provided to remove one or more objects from the list.

The linked list implementation which the system of the preferred embodiment uses in markup files includes the following enhancements:

Different objects in the linked list are actually different-typed objects that are all derived from a comment ListElement class. Thus the linked list can consist of tags, end tags, text objects, markers, etc. all linked together.

Functions are provided that allow each object to be tested for its type and contents.

Functions are provided to move forwards or backwards in the linked list to the next or prior object of a given type or of the same type as the current object. This allows for fast searches for particular objects, such as a start tag with a data value of "<p>". For any object that is not a start tag, the string representation of the object is never parsed, because the object's type does not match the requested type.

The algorithm's pseudocode is as follows:

Function: getNextOfType (T)

Assign the current object's Next pointer to a temporary object X while (X is valid, AND (X does not match the type of T, OR X does not match the contents of T))

Assign X's Next pointer to X return X

The performance benefit is achieved because the check for a type match ("X does not match the type of T") is performed before the content match ("X does not match the contents of T"), so that if the types do not match, a content match test, which has a higher overhead, is not performed.

Functions are provided to find objects matching specific criteria. These functions use the type-based Next and Previous functions, so that objects of types other than the type being searched for are not compared to the search criteria at all.

Functions are provided to find Tag-type or EndTag-type objects that are one of a range of tag values. A mask can be defined (for example, any tag in the set {<html>, <body>, <head>}) and a search can be performed using this mask. The algorithm for accomplishing this involves the following:

Each known HTML tag has a numeric value. For example <a> has the value 1 and <html> has the value 23.

The mask is created by taking a 128-bit zero value and turning on the bits that correspond to the tags in the mask. For a mask containing only <a> and <html>, the mask's bits, from highest to lowest, would consist of 105 zeros followed by "10000000000000000000001".

Tags are found using the getNextOfType(Tag) function. Each Tag object includes a numeric value identifying itself. A binary value of 1 is shifted by this value minus one (so that a value N becomes 2**N), and the result is binary AND'd against the mask. Otherwise, the next tag is searched.

Functions are provided for specific types of objects, to manipulate the objects' contents or display the object. For example, functions are provided to set, read, or change attributes on Tag objects, so that the user can determine the value of the bgcolor attribute of a <body> tag. Functions are also provided to display each object when the HTML for a document is displayed.

As is referred to above, each time a user requests a file in a review (a document), the system of the preferred embodiment reads in the markup file (or those sections that apply, if the user has asked to view a large file in sections), and opens the comment file for the document. The system dynamically generates the HTML corresponding to the file (or section) which has been requested by the user.

Before displaying anything back to the user (i.e. before forwarding an HTML document for display by the browser of the user), the system of the preferred embodiment searches for the first comment in the comment file that matches the filter settings of the user. Filter settings are described in further detail below. For example, a filter can be created so that a user can request that only comments created after a certain date be displayed. The system determines the line number of this comment.

The generation of an HTML document which will be forwarded to the user's browser for display proceeds as follows, the system travelling the linked list:

For each object reached in the linked list, determine its type.

Call the display function for that type. For most object types this simply means writing out to the HTML document what was read in from the original markup file. The system will, for example, add the appropriate HTML tag for objects defined to have a particular HTML tag type. The contents of the tag, if any will generally correspond to the contents of the object in the linked list. However, for link objects, additional work may be required to add CGI call arguments to the link, and for links that are <img> tags, the link to the image needs to be updated to point to the image CGI that the system of the preferred embodiment uses to display images.

If the type of the object in the linked list is a comment display type, check its line number. If the line number corresponds to the next comment to display, do the following:

Place into the HTML document the matching closing tags for each of the tags stored in the comment display object's OpenTags attribute. Closing tags are displayed in reverse order. This turns off any tags that are currently active.

Insert the comment in the HTML document.

Scan the comment file for the next comment and determine its line number. While the line number is the same as the current line number, insert the comment in the HTML document.

Insert into the HTML document the tags in the OpenTags attribute to turn the necessary tags back on.

The above describes the system of the preferred embodiment as it relates to the creation of collections of files for review. The system permits reviewers to add comments to dynamically generated HTML documents which will retain the original formatting of the source documents but which will permit reviewers to add comments which will be displayed within the documents of the review for the author and for other users of the system. As will be appreciated from the above description, the HTML document which is generated by the system will include within it CGI calls such that most actions taken by a reviewer or other user will result in the regeneration of the document. As a result of the architecture of the system, newly added comments are displayed on the next regeneration of the document. This results in the system behaving in a "real time" manner, where comments being added by multiple reviewers are available for the reviewers, and the author, almost as soon as they are added to the file.

The system also permits the reviewer to move between different files in a review, should the files contain links to each other. The system also supports the reviewer following links from files in the review to files outside the review, although it is not possible to include comments in files which are outside the review.

A further feature of the system which arises from its design as set out above is that reviews may be created incrementally. The review defined by an author may be added to at any time without interfering with the previously defined review. In this way a review may be made available to reviewers in stages, or releases. The newer files in the release may use links to files included in the review previously or the newer files may be independent of the previously included files.

The system of the preferred embodiment also includes other features which are made possible by the representation of the documents in the review.

Comments in the system of the preferred embodiment are assigned a severity (called a "type") and a current status (called a "disposition"). Default types and dispositions are provided by the system but an author may modify the types and dispositions for each review. A comment's type may be changed. A comment's disposition is expected to be changed to reflect the action taken on the comment by the author, for example to indicate that the comment has been entered into the source document.

The following four types of comments are available as the default in the system of the preferred embodiment:

Typo: A typing error in code, text or markup

Comment: Simple comments that may not be necessary fixes

Problem: Something is wrong: either the text cannot be understood, or the information in this part of the text is inaccurate Issue: Something is wrong on a larger scale. Problems in the text may indicate a larger misunderstanding of information, or may point to other areas where more work is needed before the text can be corrected.

The following comment dispositions are made available by the system of the preferred embodiment:

Accepted: the author has read the comment and made the changes recommended.

Rejected: the author has read the comment but is not going to make the recommended changes Open: the author has read the comment but has not resolved the problem because more information is needed, or, the author accepted or rejected the comment but a reviewer disagrees with how the comment was handled, and so re-opens the comment.

Minor: the author has accepted the comment but it was something minor, like a typo.

Suggestion: the author agrees with the reviewer's comment, but cannot make the change for this draft, or there are more important issues to deal with first.

Duplicate: the comment has already been made somewhere else in the review or file by the reviewer or by another reviewer.

Unassigned: new comments are automatically given an unassigned disposition until an author for the review, or an administrator, changes their disposition to indicate that they have read the new comments and decided what to do with them.

The system permits users to filter the files in a review. The filters are user-selectable and so the users may change the filters to see different sets of comments for the same document.

The user can tell the system to show the user only certain types of comments by filtering. The user can filter out comments with certain dispositions, comment types, comments created before a specific date or modified after another date, comments created or appended by particular users, or comments containing particular text. For example, if the user wants to see only the pages containing comments the user has not yet addressed, the user can select a filter to hide all the comments that have a disposition of "Accepted".

The system also permits each review to have a predefined access restrictions associated with it. These are referred to as authority levels.

The system implements authority levels at the server level and for each review. There are four levels of authority: Reader, Reviewer, Author, and Administrator. Each user is defined to have a level of authority at the server level. The server level authority may be thought of as a default authority. A user's authority at the server level does not, however, guarantee that the user will have the same level of authority within a particular review. For example, a user who has a default or server authority of Reader can be made an Author for a specific review. Similarly, a user with Author authority may be prevented from doing some Author-level tasks if a review's access is restricted.

The system default for each level of authority entitles a user to do the following:

Readers can read the contents of the review, search and filter comments, and view statistics, but cannot add or respond (append) to comments.

Reviewers can do what readers can do, but can also add or append to comments; they can edit or delete their own comments or appended comments, provided theirs is the most recent comment; and they can mark a file as read.

Authors can do what reviewers can do, can change the disposition of comments, and can edit or delete anyone's comments. They can also add releases (new groups of files) to a review and delete reviews they created; they can change the cutoff dates (see below) for reviews they own; and they can change the access privileges of other users to their reviews.

Administrators can do everything, including creating and deleting reviews, and creating and deleting users.

Each review has an access level. The default access level determines what users can do in the review if they have not been granted special individual access. In the list below, the authority levels Reader through Administrator refer to a user's authority at the server level.

In a Read-Only review, all users can read the review, but none can enter comments.

In a Restricted Editing review, all users can read the review, but only Reviewers and Authors can enter comments.

In an Open Editing review, all users can read the review and enter comments.

In a Private review, no one can read the review or enter comments unless they are individually authorized to do so.

However, in addition to the default access levels, individual users' access to a review can be increased or decreased, regardless of their default authority level. For example, the system can prevent a certain user from accessing an Open Editing review, even if he or she has a default, or server, authority level of Author; or the system can make a Reader an Author for a Private review.

Outside of a review, users whose server-level authority is Reader, Reviewer, or Author all have the same capabilities, except that the following tasks can only be performed by users with a server-level authority of Author:

Creating new reviews.

Deleting reviews for which the user is an author.

Creating new users. New users created by an Author can only have a default authority of Reader (only an Administrator can change the authority level).

The system of the preferred embodiment includes the ability to impose cutoff dates on comments being added to releases of files in a review. This permits reviews to have releases which have been finalized, but which are related to releases which are continuing to undergo modifications and for which comments continue to be accepted.

To change the cutoff date of a release a user must be an author for the review, or an administrator. Cutoff dates are entered in the system of the preferred embodiment in the following way:

1. The user enters the review in which a cutoff date is to be defined.
2. The user is provided with a list of releases and their cutoff dates (if any). If the user is an author for the review, or an administrator, the cutoff dates are shown as hypertext links. The user clicks on the date location to be entered.
3. The user fills in the resulting form to enter a new date.

Reviews themselves do not have cutoff dates. Cutoff dates displayed in the list of reviews are the latest new-comment cutoff dates for any release within those reviews. To change the cutoff dates for an entire review, the cutoff dates must be changed for every release in the review.

The system also permits statistics relating to a review to be simply and powerfully displayed for users. The system provides a Statistics page that is accessible from any page in a review. It displays a table showing comments sorted by disposition and type, and a table showing comments sorted by user.

Statistics in the Statistics page are, for appropriate statistics, represented as links to lists of the files containing matching comments. These links provide an efficient way of performing simple searches for comments in files in a review. It is possible for a user to narrow down all files and comments in a review to a list of comments of a specific type or from an individual reviewer.

The Statistics page is dynamically generated each time a user accesses it, so any changes made to comments after viewing statistics will be reflected in the summaries the next time the Statistics page is viewed.

As long as the review documents remain in the server's directory structure, statistics can be generated for the review even after all cutoff dates have passed.

As will be apparent from the description of the system set out above, it is possible to navigate through files in a review by moving sequentially through the files, by following links found in the files, or by navigating through the comments which are included in the files of the review. Users may also select how a file is to be displayed. Comment insertion markers may be turned off so that they are not displayed for a particular file and comments themselves may be displayed in different formats, as defined by the system and the user.

The features described above follow from the system design which permits the dynamic generation of the HTML document for communication to the browser of the user. This dynamic generation, in which the comments are stored separately from the representation of the document itself, results in the ability for the user to customize how the document appears or how it may be navigated.

Although a preferred embodiment of the present invention has been described here in detail, it will be appreciated by those skilled in the art, that variations may be made thereto, without departing from the spirit of the invention or the scope of the appended claims.

The invention claimed is:

1. A file review system for storing and managing a set of comments associated with a source file, comprising
   means for requesting the source file using unmodified standard messaging protocols,
   means for accepting data from the source file and storing a representation of the source file as a markup file,
   means for creating a comment file containing data representing the set of comments associated with the source file,
   means for accepting new comments for inclusion in the set of comments associated with the source file and for updating the comment file to correspond to the complete set of comments,
   means for generating a hypertext document from the markup file and from the comment file, the hypertext document corresponding to the source file and including portions corresponding to one or more of the set of comments associated with the source file,
   means for communicating the hypertext document to a user for display.

2. The file review system of claim 1 in which the means for accepting data from the source file and storing the source file as a markup file further comprises means for representing the source file as a linked list of objects corresponding to a hypertext representation of the source file, wherein the markup file is a binary file representation of the linked list.

3. The file review system of claim 2 in which the means for representing the source file as a linked list of objects further comprises means for inserting comment insertion objects into the linked list of objects and in which the means for generating a hypertext document further comprises means to include hypertext data in the hypertext document to display one or more symbols representing each comment insertion object.

4. The file review system of claim 3 in which the one or more symbols representing each comment insertion object comprise a hypertext link to a hypertext form for user input of a comment.

5. The file review system of claims 3 or 4 in which the means for representing the source file as a linked list of objects further comprises means for inserting comment display objects into the linked list of objects, each comment display object being associated with a comment insertion object and in which the means for generating a hypertext document further comprises means to include hypertext data in the hypertext document to display comments in accordance with the corresponding comment display objects.

6. The file review system of claim 5 in which each one of the comment display objects comprises
   open tag data representing the open hypertext tags, at the location of the comment display object, in the linked list of objects
   and in which the means for generating a hypertext document further comprises
      means to insert closing hypertext data in the hypertext document, prior to a selected one of the comments being displayed in the hypertext document, and means to inset reopening hypertext data in the hypertext document, following the selected one of the comments being displayed in the hypertext document,
      the closing hypertext data and the reopening hypertext data both being defined by the open tag data for the comment display object associated with the selected one of the comments being displayed.

7. The file review system of claim 2 in which the means for representing the source file as a linked list of objects further comprises
   a means for normalizing the linked list of objects whereby objects representing text are enclosed by objects representing paragraph tags,
      end of sentence indicators in objects in the linked list are represented in text,
      objects representing hypertext end tags are selectively located in the linked list to close all hypertext tags, and
      objects representing unnecessary hypertext tags are removed from the linked list.

8. The file review system of claim 2 in which the inked list of objects comprises objects appropriately selected from the set of objects comprising simple tag objects, tag objects, end tag objects, text objects, comment insertion objects, comment display objects, complex whitespace objects, spaces objects, newlines objects, hypertext comment objects, ordered list item tag objects, and link tag objects.

9. The file review system of claim 2 in which
   each object in the linked list of objects has a type, and comprises contents derived from a portion of the source file,
   each comment insertion object and each comment display object comprises a contents line identifier, representing the line number defining the location of the object in relation to the source file,
   the comment file consists of comment line identifier data associated with the set of comments representing the line numbers in the source file with which each comment is related,
   and in which the means for generating a hypertext document further comprises
      means to traverse the linked list of objects comprising, and means to select a display object from the linked list of objects,
      means to determine the type of the display object,
      means to generate hypertext data to correspond to the type of the display object and the contents of the display object,
      means to identify the contents line identifier for the display object and for selecting comment display data from the comment file based on the contents line identifier and the comment line identifiers of the comment file,
      means to generate hypertext data from the comment file representing the selected one of the set of comments corresponding to the comment line identifier associated with the contents line identifier.

10. The file review system of claim 2, in which the means for generating a hypertext document comprises means for selectively excluding portions of the comment file corresponding to one or more comments in the set of comments, whereby a selectively defined subset of the set of comments is represented in the hypertext document.

11. The file review system of claim 10, in which comments comprise comment attributes, the means for selectively excluding portions of the comment file further comprising means for selectively defining the subset of the set of comments by selection based on comment attributes.

12. The file review system of claim 11 in which the comment attributes comprise one or more of comment type, comment severity, comment date, comment status, comment author, and comment content.

13. The file review system of claim 1 in which the means for generating a hypertext document further comprises means to generate a hypertext document which corresponds to a predefined subsection of the markup file and the associated subsection of the comment file.

14. The file review system of claim 1 in which system users are uniquely identified in the system and in which the means for accepting new comments further comprises means for selectively restricting the inclusion of new comments in the set of comments based on the unique identity of system users.

15. The file review system of claim 1 in which the source file is associated with a defined cutoff date and in which the means for accepting new comments further comprises means for selectively restricting the inclusion of new comments on dates past the defined cutoff date.

16. The file review system of claim 1 further comprising means to navigate the comment file to provide user access to comments in user-defined sequenced order.

17. The file review system of claim 1 further comprising means to collect and display statistics relating to the set of comments.

18. The file review system of claim 17 in which the means to collect and display statistics further comprises means for displaying hypertext links in the statistics display whereby a user may access a selected subset of the set of comments by means of the hypertext link.

19. A web-based file review system for storing and managing comments from a plurality of reviewers, the comments being associated with one or more webs of source files, comprising a parser to parse a selected one of the set of source files into a linked list of objects corresponding to a hypertext representation of the selected source file, the linked list further comprising comment insertion objects and comment display objects, the parser writing the linked list of objects to a binary markup file representing the linked list of objects and corresponding to the selected one of the set of source files, each comment display object being capable of being associated with one or more comments, a set of comment files, each comment file being associated with a one of the set of source files and comprising data representing comments associated with the one of the set of source files, common gateway interface program code means for accepting new comments for inclusion in the set of comments associated with a reviewer-defined source file and for updating the associated comment file, common gateway interface program code means for generating a hypertext document from a markup file corresponding to reviewer-selected source file and from the associated comment file, the hypertext document corresponding to the reviewer-selected source file, wherein said source file is selected using unmodified standard messaging protocols, and the hypertext document including portions corresponding to one or more of the set of comments associated with the reviewer-selected source file, the hypertext data for each portion relating to a comment to be displayed being defined by the associated comment display object, the hypertext document selectively including hypertext links representing comment insertion objects, the hypertext links providing reviewers with forms for reviewer entry of comments, the hypertext document selectively including hypertext data for calling the common gateway interface program for generating a hypertext document and the hypertext document selectively including hypertext data for calling the common gateway interface program for accepting new comments, means for communicating the hypertext document to a browser for display.

20. The system of claim 19, in which each one of the comment display objects comprises open tag data representing the open hypertext tags, at the location of the comment display object, in the linked list of objects, and in which the common gateway interface program code means for generating a hypertext document further comprises means to insert closing hypertext data in the hypertext document, prior to a selected one of the comments being displayed in the hypertext document, and means to insert reopening hypertext data in the hypertext document, following the selected one of the comments being displayed in the hypertext document, the closing hypertext data and the reopening hypertext data both being defined by the open tag data for the comment display object associated with the selected one of the comments being displayed.

21. The system of claim 19 in which the linked list of objects comprises objects appropriately selected from the set of objects comprising simple tag objects, tag objects, end tag objects, text objects, comment insertion objects, comment display objects, complex whitespace objects, spaces objects, newlines objects, hypertext comment objects, ordered list item tag objects, and link tag objects.

22. The system of claim 19 in which each object in the linked list of objects has a type, and comprises contents derived from a portion of the source file, each comment insertion object and each comment display object comprises a contents line identifier, representing the line number defining the location of the object in relation to the source file, the comment file consists of comment line identifier data associated with the set of comments representing the line numbers in the source file with which each comment is related, and in which the common gateway interface program code means for generating a hypertext document further comprises means to traverse the linked list of objects, and means to select a display object from the linked list of objects, means to determine the type of the display object, means to generate hypertext data to correspond to the type of the display object and the contents of the display object, means to identify the contents line identifier for the display object and for selecting comment display data from the comment file based on the contents line identifier and the comment line identifiers of the comment file, and means to generate hypertext data from the comment file representing the selected one of the set of comments corresponding to the comment line identifier associated with the contents line identifier.

23. An article of manufacture comprising:
a computer usable medium having computer readable program code means embodied therein for causing the storage and management of comments in a web-based file review system, the comments being from a plurality of reviewers, and being associated with one or more webs of source files, the computer readable program code means in the article of manufacture comprising
  computer readable program code means for causing a computer to parse a selected one of the set of source files into a linked list of objects corresponding to a hypertext representation of the selected source file, the linked list further comprising comment insertion objects and comment display objects, the parser writing the linked list of objects to a binary markup file representing the linked list of objects and corresponding to the selected one of the set of source files, each comment display object associated with one or more comments,
  computer readable program code means for causing the computer to create and manage a set of comment files, each comment file being associated with a one of the set of source files and comprising data representing comments associated with the one of the set of source files,
  computer readable program code means for causing the computer to accept new comments for inclusion in the set of comments associated with a reviewer-defined source file and to update the associated comment file,
  computer readable program code means for causing the computer to generate a hypertext document from a markup file corresponding to reviewer-selected source file and from the associated comment file, the hypertext document corresponding to the reviewer-selected source file, wherein said source file is selected responsive to browser requests and
    the hypertext document including portions corresponding to one or more of the set of comments associated with the reviewer-selected source file, the hypertext data for each portion relating to a comment to be displayed being defined by the associated comment display object,
    the hypertext document selectively including hypertext links representing comment insertion objects, the hypertext links providing reviewers with forms for reviewer entry of comments,
    the hypertext document selectively including hypertext data for calling the common gateway interface program for generating a hypertext document and the hypertext document selectively including hypertext data for calling the common gateway interface program for accepting new comments,
  computer readable program code means for causing the computer to communicate the hypertext document to a browser for display.

24. The article of manufacture of claim 23, in which each one of the comment display objects comprises
  open tag data representing the open hypertext tags, at the location of the comment display object, in the linked list of objects,
  and in which the computer readable program code means for causing the computer to generate a hypertext document further comprises
    means to insert closing hypertext data in the hypertext document, prior to a selected one of the comments being displayed in the hypertext document, and
    means to insert reopening hypertext data in the hypertext document, following the selected one of the comments being displayed in the hypertext document,
    the closing hypertext data and the reopening hypertext data both being defined by the open tag data for the comment display object associated with the selected one of the comments being displayed.

25. The article of manufacture of claim 23 in which the linked list of objects comprises objects appropriately selected from the set of objects comprising simple tag objects, tag objects, end tag objects, text objects, comment insertion objects, comment display objects, complex whitespace objects, spaces objects, newlines objects, hypertext comment objects, ordered list item tag objects, and link tag objects.

26. The article of manufacture of claim 23 in which
  each object in the linked list of objects has a type, and comprises contents derived from a portion of the source file,
  each comment insertion object and each comment display object comprises a contents line identifier, representing the line number defining the location of the object in relation to the source file,
  the comment file consists of comment line identifier data associated with the set of comments representing the line numbers in the source file with which each comment is related,
  and in which the computer readable program code means for causing the computer to generate a hypertext document further comprises
    means to traverse the linked list of objects, and means to select a display object from the linked list of objects,
    means to determine the type of the display object,
    means to generate hypertext data to correspond to the type of the display object and the contents of the display object,
    means to identify the contents line identifier for the display object and for selecting comment display data from the comment file based on the contents line identifier and the comment line identifiers of the comment file, and
    means to generate hypertext data from the comment file representing the selected one of the set of comments corresponding to the comment line identifier associated with the contents line identifier.

27. A computer program product for use with a hypertext server, the computer program product comprising:
a computer usable medium having computer readable program code means embodied in the medium for causing the storage and management of comments in a web based file review system, the comments being from a plurality of reviewers, and being associated with one or more webs of source files, the computer program product having:
  computer readable program code means for causing a computer to parse a selected one of the set of source files into a linked list of objects corresponding to a hypertext representation of the selected source file, the linked list further comprising comment insertion objects and comment display objects, the parser writing the linked list of objects to a binary markup file representing the linked list of objects and corresponding to the selected one of the set of source files, each comment display object associated with one or more comments, computer readable program code means for causing the computer to create and manage a set of comment files, each comment file being associated with a one of the set of source files and comprising data representing comments associated with the one of the set of source files, computer readable program code means for causing the computer to accept new comments for inclusion in the set of comments associated with a reviewer-defined source file and to update the associated comment file, computer readable program code means for causing the computer to generate a hypertext document from a markup file corresponding to reviewer-selected source file and from the associated comment file, the hypertext document corresponding to the reviewer-selected source file, wherein said source file is selected responsive to browser requests, and the hypertext document including portions corresponding to one or more of the set of comments associated with the reviewer-selected source file, the hypertext data for each portion relating to a comment to be displayed being defined by the associated comment display object, the hypertext document selectively including hypertext links representing comment insertion objects, the hypertext links providing reviewers with forms for reviewer entry of comments, the hypertext document selectively including hypertext data for calling the common gateway interface program for generating a hypertext document and the hypertext document selectively including hypertext data for calling the common gateway interface program for accepting new comments, computer readable program code means for causing the computer to communicate the hypertext document to a browser for display.

28. The computer program product of claim 27, in which each one of the comment display objects comprises open tag data representing the open hypertext tags, at the location of the comment display object, in the linked list of objects, and in which the computer readable program code means for causing the computer to generate a hypertext document further comprises means to insert closing hypertext data in the hypertext document, prior to a selected one of the comments being displayed in the hypertext document, and means to insert reopening hypertext data in the hypertext document, following the selected one of the comments being displayed in the hypertext document, the closing hypertext data and the reopening hypertext data both being defined by the open tag data for the comment display object associated with the selected one of the comments being displayed.

29. The computer program product of claim 27 in which the linked list of objects comprises objects appropriately selected from the set of objects comprising simple tag objects, tag objects, end tag objects, text objects, comment insertion objects, comment display objects, complex whitespace objects, spaces objects, newlines objects, hypertext comment objects, ordered list item tag objects, and link tag objects.

30. The computer program product of claim 27 in which each object in the linked list of objects has a type, and comprises contents derived from a portion of the source file, each comment insertion object and each comment display object comprises a contents line identifier, representing the line number defining the location of the object in relation to the source file, the comment file consists of comment line identifier data associated with the set of comments representing the line numbers in the source file with which each comment is related, and in which the computer readable program code means for causing the computer to generate a hypertext document further comprises means to traverse the linked list of objects, and means to select a display object from the linked list of objects, means to determine the type of the display object, means to generate hypertext data to correspond to the type of the display object and the contents of the display object, means to identify the contents line identifier for the display object and for selecting comment display data from the comment file based on the contents line identifier and the comment line identifiers of the comment file, and means to generate hypertext data from the comment file representing the selected one of the set of comments corresponding to the comment line identifier associated with the contents line identifier.

31. A method for storing and managing a set of comments associated with a source file, in a file review system, the method comprising the steps of requesting the source file using unmodified standard messaging protocols, accepting data from the source file and storing a representation of the source file as a markup file, creating a comment file containing data representing the set of comments associated with the source file, responding to user input to accept new comments for inclusion in the set of comments associated with the source file and for updating the comment file to correspond to the complete set of comments, responding to user input to dynamically generate a hypertext document from the markup file and from the comment file, the hypertext document corresponding to the source file and including portions corresponding to one or more of the set of comments associated with the source file, communicating the hypertext document to a user for display.

32. The method of claim 31 in which the step of accepting data from the source file and storing the source file as a markup file comprises the step of representing the source file as a linked list of objects corresponding to a hypertext representation of the source file, wherein the markup file is a binary file representation of the linked list.

33. The method of claim 32 in which the step of representing the source file as a linked list of objects further comprises the step of inserting comment insertion objects into the linked list of objects and in which step of generating a hypertext document further comprises the step of including hypertext data in the hypertext document to display one or more symbols representing each comment insertion object.

34. The method of claim 33 in which the step of including hypertext data in the hypertext document to display one or more symbols representing each comment insertion object further comprises the step of including a hypertext link to a hypertext form for user input.

35. The method of claims 33 or 34 in step of representing the source file as a linked list of objects further comprises the step of inserting comment display objects into the linked list of objects, each comment display object being associated with a comment insertion object and in which the step of generating a hypertext document further comprises the step of including hypertext data in the hypertext document to display comments in accordance with the corresponding comment display objects.

36. The method of claim 35 in which each one of the comment display objects comprises open tag data representing the open hypertext tags, at the location of the comment display object, in the linked list of objects and in which the step of generating a hypertext document further comprises the steps of inserting closing hypertext data in the hypertext document, prior to a selected one of the comments being displayed in the document, and inserting reopening hypertext data in the hypertext document, following the selected one of the comments being displayed in the hypertext document, the closing hypertext data and the reopening hypertext data both being defined by the open tag data for the comment display object associated with the selected one of the comments being displayed.

37. A program storage device readable by a machine, tangibly embodying a program of instructions executable by the machine to perform method steps for storing and managing comments in a web-based file review system, the method steps comprising the steps of claims 31, 32, 33, 34, 35, or 36.

38. A method for storing and managing comments in a web-based file review system, the comments being from a plurality of reviewers and being associated with one or more webs of source files, comprising the steps of parsing a selected one of the set of source files into a linked list of objects corresponding to a hypertext representation of the selected source file, the linked list further comprising comment insertion objects and comment display objects, the parser writing the linked list of objects to a binary markup file representing the linked list of objects and corresponding to the selected one of the set of source files, each comment display object associated with one or more comments, on review request, accepting new comments for inclusion in the set of comments associated with a reviewer-defined source file and for updating an associated comment file, the comment file being associated with a one of the set of source files and comprising data representing comments associated with the one of the set of source file, dynamically generating a hypertext document from a markup file corresponding to reviewer-selected source file and from the associated comment file, the hypertext document corresponding to the reviewer-selected source file, wherein said source file is selected responsive to unmodified standard messaging protocols, and the hypertext document including portions corresponding to one or more of the set of comments associated with the reviewer-selected source file, the hypertext data for each portion relating to a comment to be displayed being defined by the associated comment display object, the hypertext document selectively including hypertext links representing comment insertion objects, the hypertext links providing reviewers with forms for reviewer entry of comments, the hypertext document selectively including hypertext data for calling a common gateway interface program for generating a hypertext document and the hypertext document selectively including hypertext data for calling the common gateway interface program for accepting new comments, communicating the hypertext document to a browser for display.

39. A program storage device readable by a machine, tangibly embodying a program of instructions executable by the machine to perform method steps for storing and managing comments in a web-based file review system, the method steps comprising the steps of claim 38.

* * * * *